US009473316B2

(12) United States Patent
Chetuparambil et al.

(10) Patent No.: US 9,473,316 B2
(45) Date of Patent: Oct. 18, 2016

(54) RESOURCE CONSUMPTION REDUCTION VIA MEETING AFFINITY

(75) Inventors: Madhu K. Chetuparambil, Raleigh, NC (US); James S. Johnston, Lexington, KY (US); Christopher D. Price, Georgetown, KY (US); Brian L. Pulito, Lexington, KY (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 11/550,092

(22) Filed: Oct. 17, 2006

(65) Prior Publication Data

US 2008/0091779 A1  Apr. 17, 2008

(51) Int. Cl.
| | |
|---|---|
| *H04L 12/18* | (2006.01) |
| *H04N 7/15* | (2006.01) |
| *H04L 29/08* | (2006.01) |
| *G06Q 10/10* | (2012.01) |
| *H04L 29/06* | (2006.01) |

(52) U.S. Cl.
CPC .......... *H04L 12/1827* (2013.01); *G06Q 10/10* (2013.01); *H04L 12/1822* (2013.01); *H04L 65/403* (2013.01); *H04L 67/1027* (2013.01); *H04L 67/14* (2013.01)

(58) Field of Classification Search
CPC ........... H04L 12/1827; H04L 12/1822; H04L 67/1027

USPC ....................................................... 709/204
See application file for complete search history.

(56) References Cited

U.S. PATENT DOCUMENTS

| | | | |
|---|---|---|---|
| 6,006,264 A | 12/1999 | Colby et al. | |
| 6,424,992 B2 * | 7/2002 | Devarakonda et al. | ...... 709/203 |
| 6,947,992 B1 | 9/2005 | Shachor | |
| 2002/0095465 A1 | 7/2002 | Banks et al. | |
| 2002/0133611 A1 * | 9/2002 | Gorsuch et al. | ............... 709/231 |
| 2002/0161896 A1 | 10/2002 | Wen et al. | |
| 2004/0059785 A1 * | 3/2004 | Blume | .......................... 709/206 |
| 2004/0249939 A1 | 12/2004 | Amini et al. | |
| 2005/0055435 A1 * | 3/2005 | Gbadegesin et al. | .......... 709/224 |
| 2006/0026290 A1 * | 2/2006 | Pulito et al. | ................... 709/227 |

* cited by examiner

*Primary Examiner* — Aaron Strange
(74) *Attorney, Agent, or Firm* — Steven M. Greenberg, Esq.; CRGO Law

(57) ABSTRACT

Embodiments of the present invention address deficiencies of the art in respect to resource consumption in a clustered environment hosting an e-meeting and provide a method, system and computer program product for resource consumption reduction for an e-meeting via meeting affinity. In one embodiment of the invention, an e-meeting affinity method can be provided. In a clustered environment, the e-meeting affinity method can include identifying a clone supporting an e-meeting and having session affinity with a moderator to the e-meeting. The method further can include establishing session affinity between the clone and other participants to the e-meeting for requests relating to the e-meeting while permitting parallel session affinity to other clones for requests from the other participants not relating to the e-meeting.

15 Claims, 2 Drawing Sheets

RESOURCE CONSUMPTION REDUCTION VIA MEETING AFFINITY

BACKGROUND OF THE INVENTION

1. Field of the Invention

The present invention relates to the field of collaborative computing and more particularly to managing resource consumption for an e-meeting hosted within a cluster of servers.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include both synchronous forms of collaboration such as instant messaging and application sharing, and asynchronous forms of collaboration such as discussion forums and document libraries.

An e-meeting represents one popular form of electronic collaboration. In an e-meeting, participants can view a common space, for instance a whiteboard or a shared application (or both), through which ideas can be exchanged. The viewing of the common space can be complemented with a teleconference, a videoconference, an instant messaging session, or any combination thereof, such that the e-meeting can act as a near substitute for an in-person meeting in a conference room. In as much as an e-meeting can involve a set of different participants utilizing a diverse set of computing tools, the resource consumption of any given e-meeting can be significant.

The problem of e-meeting resource consumption can be compounded in a clustered environment where multiple servers host multiple e-meeting instances according to high-availability and load balancing principles. Specifically, in the clustered environment, different participants to an e-meeting can be handled by different servers in order to achieve availability and load balancing objectives in the cluster. However, to support participants to an e-meeting across different servers can require substantial replication of e-meeting specific data across the different servers of the cluster. Therefore, unnecessary resource consumption can result merely through data replication for the e-meeting.

Clustered environments have long incorporated session affinity as a tool for ensuring that individual clients remain bound to a particular server in a cluster. Specifically, session affinity refers to the logical linkage between a requesting client and a responsive clone or process in a server group, often referred to in the art as a node, where both the requesting client and the responsive clone or node have engaged in a communicative session. In consequence of session affinity, within a session once a server clone has been selected to respond to the requests of a client, the selected clone can remain bound to the requesting client throughout the duration of the session. As a result of this binding, the prevailing selection policy need be applied only once in a session and the overhead resulting from the needless re-application of the selection policy can be avoided. Notwithstanding, while session affinity accounts for a binding of an individual to a particular server, session affinity does not treat the circumstance where the individual belongs to a group such as a group of participants to an e-meeting.

BRIEF SUMMARY OF THE INVENTION

Embodiments of the present invention address deficiencies of the art in respect to resource consumption in a clustered environment hosting an e-meeting and provide a novel and non-obvious method, system and computer program product for resource consumption reduction for an e-meeting via meeting affinity. In one embodiment of the invention, an e-meeting affinity method can be provided. In a clustered environment, the e-meeting affinity method can include identifying a clone supporting an e-meeting and having session affinity with a participant to the e-meeting—for instance the moderator of the e-meeting. The method further can include establishing session affinity between the clone and other participants to the e-meeting for requests relating to the e-meeting while permitting parallel session affinity to other clones for requests from the other participants not relating to the e-meeting.

In one aspect of the embodiment, identifying a clone supporting an e-meeting and having session affinity with a participant to the e-meeting can include determining an identifier for the session affinity, and deriving an identifier for meeting affinity for the e-meeting from the identifier for the session affinity. As such, establishing session affinity between the clone and other participants to the e-meeting can include providing the identifier for meeting affinity to the other participants to the e-meeting, and forcing session affinity with the clone for requests from the other participants incorporating the identifier for meeting affinity. In another aspect of the embodiment, determining an identifier for the session affinity can include initiating a request with a meeting servlet in the clustered environment and receiving from the meeting servlet in response to the request an identifier for meeting affinity for the participant.

In another embodiment of the invention, a message affinity configured collaborative data processing system can be provided. The system can include a sprayer coupled to a set of clones in a clustered environment. Each of the clones can include a configuration for supporting a plurality of e-meetings for different moderators and participants to the e-meetings. Session affinity logic can be coupled to the clones as can a meeting servlet. The meeting servlet can include program code enabled to facilitate the establishment of meeting affinity with a particular one of the clones for a moderator and a set of participants to an e-meeting supported by the particular one of the clones.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for reducing resource usage in a cluster through meeting affinity. In accordance with an embodiment of the present invention, participants to an e-meeting can establish affinity with a particular server in a clustered collaborative system. Specifically, a participant to an e-meeting, such as the moderator of the e-meeting, can select a particular server to which affinity is to be maintained, and the other participants to the e-meeting can be notified of the selected server. Thereafter, the participants can establish affinity with the selected server thereby obviating the need to replicate e-meeting data across different servers in the clustered collaborative system.

Figure 1:
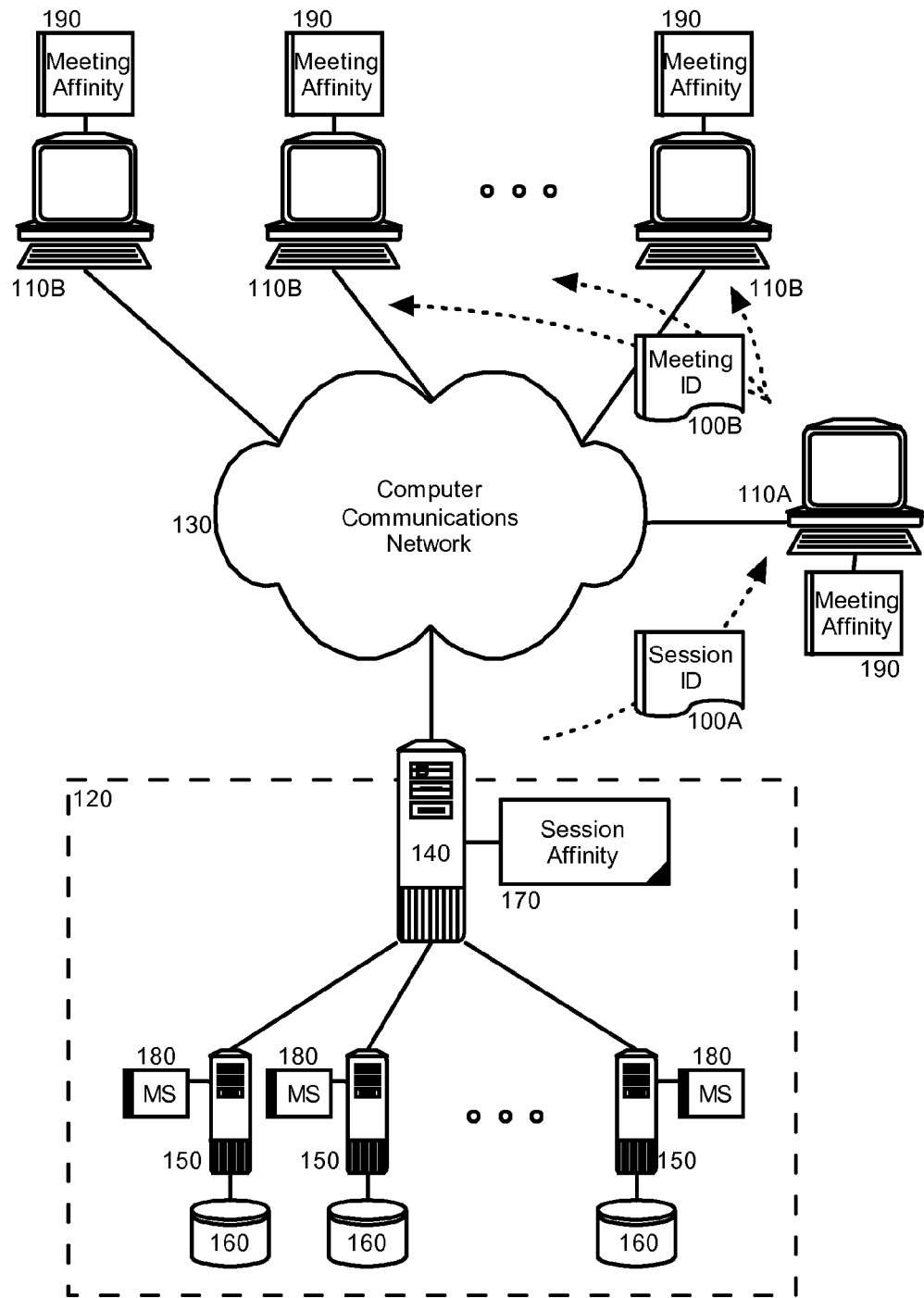
FIG. 1 is a schematic illustration of a clustered collaborative system configured for meeting affinity; and, FIG. 2 is a message flow diagram illustrating a process for establishing meeting affinity in a clustered collaborative system.

In further illustration, FIG. 1 is a schematic illustration of a clustered collaborative system configured for meeting affinity. The clustered collaborative system can include a cluster of servers 120 configured for communicative coupling to one or more participant computing platforms 110A, 110B over a computer communications network 130. The cluster of servers 120 can include a router or sprayer 140 coupled to a set of clones 150, each having a configuration for hosting e-meetings on behalf of the cluster of servers 120 as if only a single server had been established to host e-meetings. Each of the clones 150 further can include e-meeting resources 160 provided to support the hosting of e-meetings in respective ones of the clones 150.

The clustered collaborative system can include session affinity logic 170 coupled to the sprayer 140. The session affinity logic 170 can include program code enabled to establish session affinity for an individual one of the participant computing platforms 110A, 110B with a selected one of the clones 150. To achieve session affinity, the program code can be enabled to provide a session identifier for the selected one of the clones 150 to a participant computing platform 110A, 110B at the outset of a session. For each communicative transaction thereafter, the program code of the session affinity logic 170 can direct the communicative transaction to the selected one of the clones 150 indicated by the session identifier.

Notably, the clustered collaborative system further can include a set of meeting servlets 180 corresponding to individual ones of the clones 150. Each meeting servlet 180 can include program code enabled to establish an e-meeting for a group of participants via corresponding participant computing platforms 110A, 110B. The program code of the meeting servlet 180 further can be enabled to facilitate the establishment of meeting affinity for the participants to the e-meeting and to utilize a meeting affinity identifier in lieu of a session identifier when configuring subsequent requests for routing to specified ones of the clones 150. Specifically, in operation a particular one of the participants to the e-meeting, such as a moderator of the e-meeting, through moderator participant platform 110A can determine session affinity for a clone 150 in the cluster 120 in a session identifier 100A. Meeting affinity code 190 for the moderator participant platform 110A can publish the session identifier 100A as a meeting identifier 100B to other participant platforms 110B for the e-meeting.

Thereafter, the meeting affinity code 190 for each of the participant platforms 110A, 110B can utilize the meeting identifier 100B as a session identifier in forcing session affinity to the same one of the clones 150 in the cluster of servers 120. In this way, meeting affinity can be established for all participants to the e-meeting. As an alternative, meeting affinity can be established just for a single tool within the e-meeting, such as a white boarding session, or a screen sharing session. In consequence, the resources 160 for the selected one of the clones 150 will be the same for all of the participants to the e-meeting thereby eliminating the need to replicate resources across multiple ones of the clones 150 in the cluster of servers 120.

Figure 2:
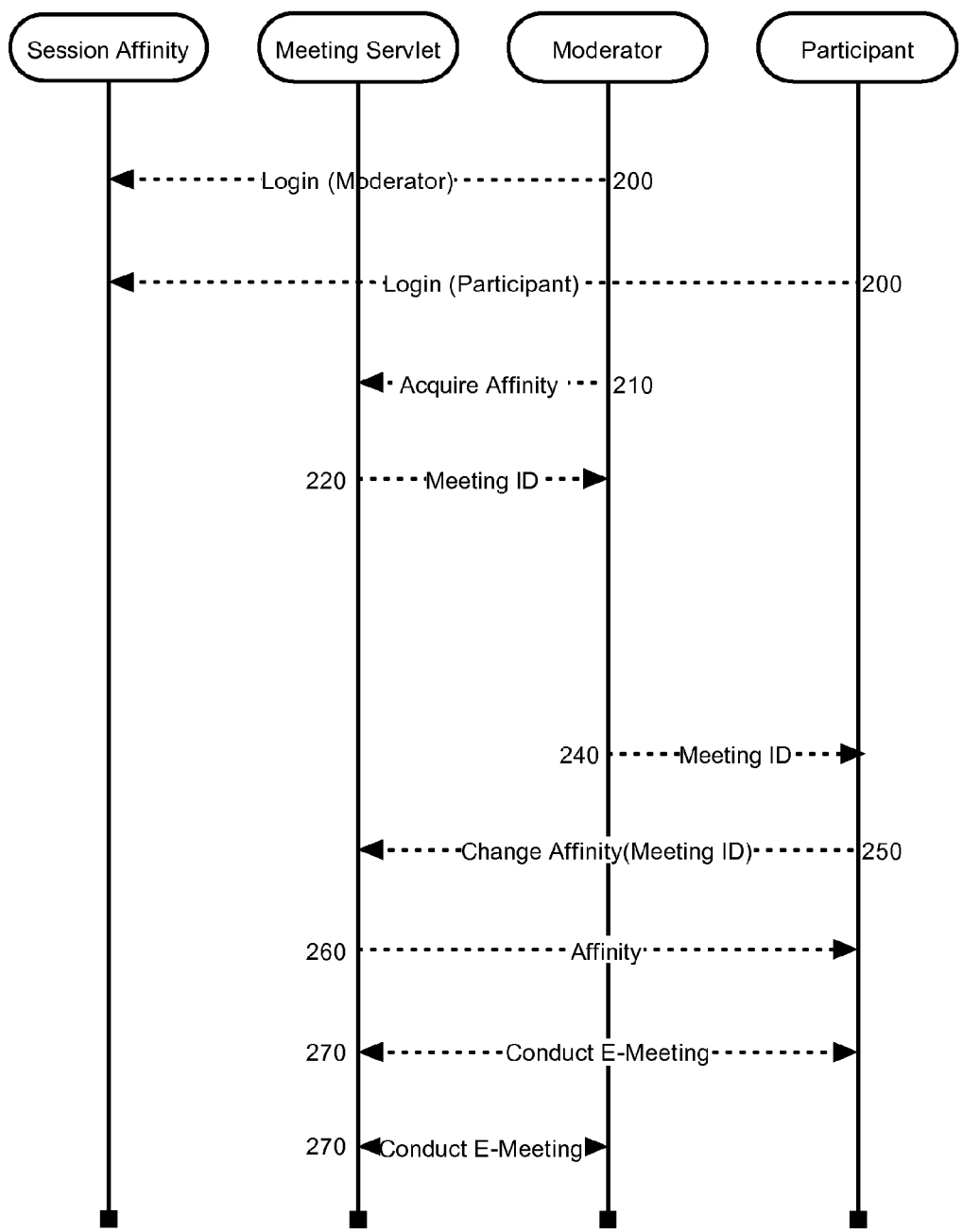

In yet further illustration, FIG. 2 is a message flow diagram illustrating a process for establishing meeting affinity in a clustered collaborative system. As shown in FIG. 2, in step 200, the moderator and one or more participants to an e-meeting can establish an e-meeting and each of the moderator and participants can receive session affinity to a clone in the clustered environment. In step 210, the moderator can acquire the identity of the clone with which the moderator has attained session affinity. In particular, the moderator can initiate a request to the meeting servlet to identify the clone and in step 220, the meeting servlet can respond by providing the session identifier to the moderator in the form of a meeting identifier which is identical to the session identifier. In particular, the meeting servlet can return the meeting identifier within a cookie.

Thereafter, in step 240 the moderator can send the meeting identifier to the participants to the e-meeting via sideband channel such as a lightweight session initiated protocol (SIP) message. Alternatively, the participants to the e-meeting can acquire the meeting identifier from a shared desktop of the moderator. As yet another alternative, the participants to the e-meeting can acquire the meeting identifier from a central repository through the meeting servlet. In any case, in step 250, the participants can change their session affinity for e-meeting related requests to the clone specified by the meeting identifier by forwarding a request to the meeting servlet. In step 260, the meeting servlet can respond to each of the participants with a cookie containing the identity of the clone for the e-meeting. Finally, in step 270, the e-meeting can be conducted knowing that meeting affinity has been established for the moderator and the remaining participants without tampering with session affinity for requests that are not related to the e-meeting.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a clustered environment for an e-meeting, an e-meeting affinity method comprising:
   identifying in affinity logic coupled to a sprayer and executing in memory of a computer, a clone amongst a set of clones supporting the e-meeting and having session affinity with a participant to the e-meeting, each clone in the set of clones having a configuration for hosting e-meetings on behalf of a cluster of servers as if only a single server had been established to host e-meetings;
   acquiring, by the participant to the e-meeting, a meeting identifier for the clone from a meeting servlet coupled to the clone amongst the set of clones supporting the e-meeting in response to sending a request to the meeting servlet to identify the clone amongst the set of clones supporting the e-meeting, and receiving the meeting identifier from the meeting servlet;
   providing, by the participant to the e-meeting, the meeting identifier to the other participants to the e-meeting; and,
   establishing session affinity between the clone and other participants to the e-meeting for requests relating to the e-meeting by changing a session identifier to the meeting identifier for any other participants to the e-meeting determined to have a different meeting identifier than the participant to the e-meeting,
   at least one participant to the e-meeting maintaining parallel session affinity with another clone for requests from the other participants not related to the e-meeting.

2. The method of claim 1, wherein the meeting identifier is derived from the session identifier.

3. The method of claim 1, wherein providing the meeting identifier to the other participants to the e-meeting comprises transmitting the meeting identifier to the other participants to the e-meeting through a sideband channel.

4. The method of claim 3, wherein transmitting the meeting identifier to the other participants to the e-meeting through the sideband channel comprises transmitting the meeting identifier for meeting affinity to the other participants to the e-meeting through a session initiation protocol (SIP) message.

5. The method of claim 1, wherein providing the meeting identifier to the other participants to the e-meeting comprises storing the meeting identifier for retrieval by the other participants to the e-meeting in a central repository.

6. The method of claim 1, wherein providing the meeting identifier to the other participants to the e-meeting comprises storing the meeting identifier for retrieval by the other participants to the e-meeting through a shared desktop of the participant to the e-meeting.

7. The method of claim 1, wherein identifying the clone supporting the e-meeting and having session affinity with the participant to the e-meeting, comprises identifying a clone supporting an e-meeting and having session affinity with a moderator for the e-meeting.

8. A message affinity configured collaborative data processing system comprising:
   a sprayer executing in memory by a processor of a computer coupled to a plurality of clones in a clustered environment, each of the clones comprising a configuration for supporting a plurality of e-meetings for different moderators and participants to the e-meetings;
   session affinity logic coupled to the sprayer;
   a meeting servlet coupled to each of the clones, the meeting servlet comprising program code enabled to establish meeting affinity with a particular one of the clones for a moderator to a portion of an e-meeting utilizing a particular tool in the e-meeting, and a set of participants to the e-meeting also utilizing the particular tool and supported by the particular one of the clones; and,
   meeting affinity logic executing in memory of the moderator and also in memory of the set of participants, the meeting affinity logic comprising program code enabled to acquire, by the moderator, a meeting identifier for the particular one of the clones from the meeting servlet coupled to the particular one of the clones supporting the e-meeting by sending a request to the meeting servlet to identify the particular one of the clones supporting the e-meeting and receiving the meeting identifier from the meeting servlet, to provide, by the moderator, the meeting identifier to the set of participants to the e-meeting, and to change a session identifier to the meeting identifier for any one of the set of participants to the e-meeting determined to have a different meeting identifier than the moderator,
   at least one participant to the e-meeting maintaining parallel session affinity with another clone for requests from the other participants not related to the e-meeting.

9. A computer program product comprising a non-transitory computer usable storage medium embodying computer usable program code for e-meeting affinity in a clustered environment, the computer program product including:
   computer usable program code for identifying a clone amongst a set of clones supporting an e-meeting and having session affinity with a participant to the e-meeting, each clone in the set of clones having a configuration for hosting e-meetings on behalf of a cluster of servers as if only a single server had been established to host e-meetings;
   computer usable program code for acquiring, by the participant to the e-meeting, a meeting identifier for the clone from a meeting servlet coupled to the clone amongst the set of clones supporting the e-meeting by sending a request to the meeting servlet to identify the clone amongst the set of clones supporting the e-meeting and receiving the meeting identifier from the meeting servlet;
   computer usable program code for providing, by the participant to the e-meeting, the meeting identifier to the other participants to the e-meeting; and, computer usable program code for establishing session affinity between the clone and other participants to the e-meeting for requests relating to the e-meeting by changing a session identifier to the meeting identifier for any other participants to the e-meeting determined to have a different meeting identifier than the participant to the e-meeting, at least one participant to the e-meeting maintaining parallel session affinity with another clone for requests from the other participants not related to the e-meeting.

10. The computer program product of claim 9, wherein the meeting identifier is derived from the session identifier.

11. The computer program product of claim 9, wherein the computer usable program code for providing the meeting identifier to the other participants to the e-meeting comprises computer usable program code for transmitting the meeting identifier to the other participants to the e-meeting through a sideband channel.

12. The computer program product of claim 11, wherein the computer usable program code for transmitting the meeting identifier to the other participants to the e-meeting through the sideband channel comprises computer usable program code for transmitting the meeting identifier to the other participants to the e-meeting through a session initiation protocol (SIP) message.

13. The computer program product of claim 9, wherein the computer usable program code for providing the meeting identifier to the other participants to the e-meeting comprises computer usable program code for storing the meeting identifier for retrieval by the other participants to the e-meeting in a central repository.

14. The computer program product of claim 9, wherein the computer usable program code for providing the meeting identifier to the other participants to the e-meeting comprises computer usable program code for storing the meeting identifier for retrieval by the other participants to the e-meeting through a shared desktop of the participant to the e-meeting.

15. The computer program of claim 9, wherein the computer usable program code for identifying the clone supporting the e-meeting and having session affinity with the participant to the e-meeting, comprises computer usable program code for identifying a clone supporting an e-meeting and having session affinity with a moderator for the e-meeting.

* * * * *